Patented Mar. 11, 1947

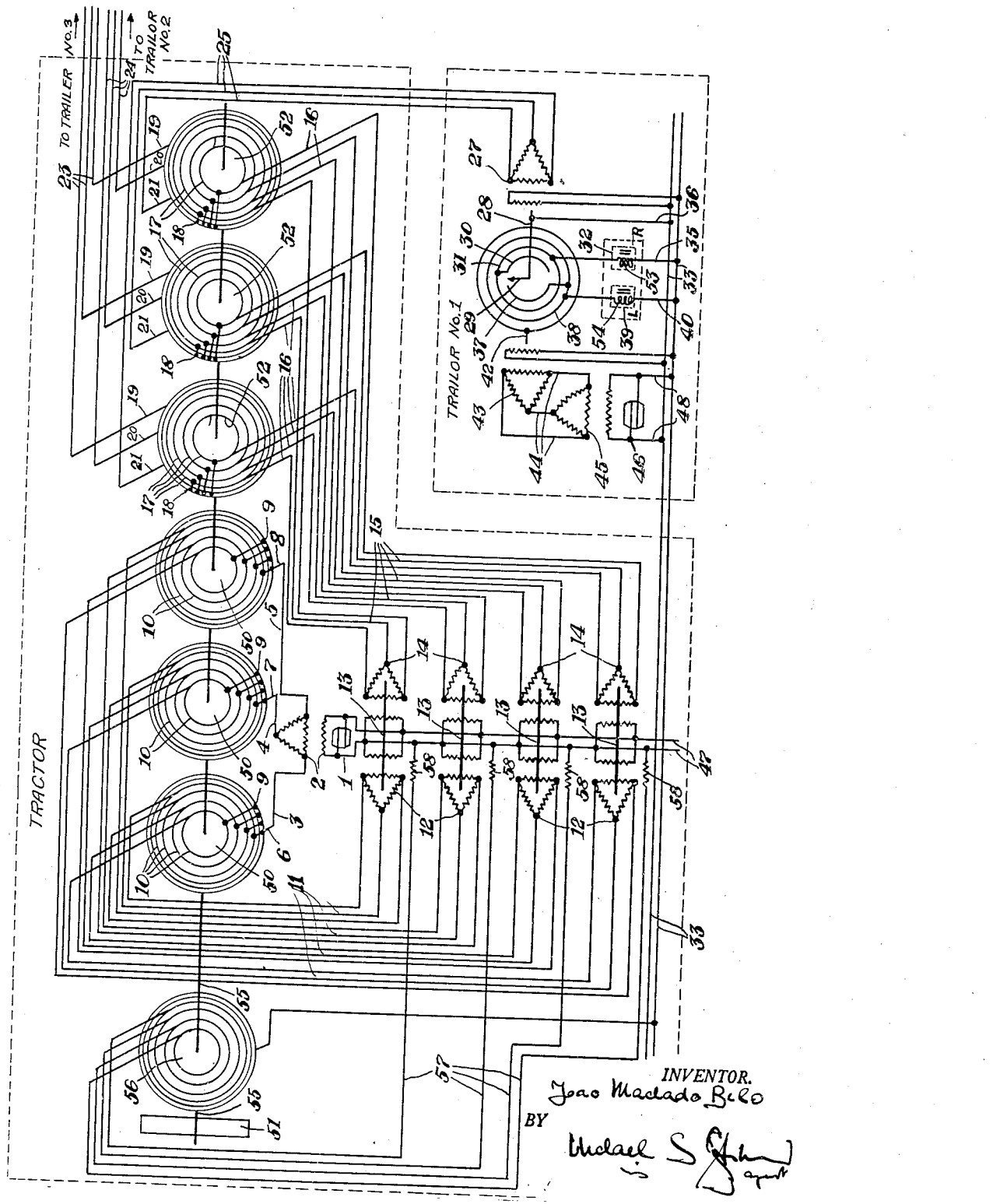

2,417,287

UNITED STATES PATENT OFFICE 2,417,287

STEERING GEAR FOR TRAILERS

João Machado Belo, Beira, Portuguese East Africa

Application September 16, 1944, Serial No. 554,517

5 Claims. (Cl. 180—14)

This invention relates to steering gear for trailers.

Hitherto it has not been found practicable to operate trains of trailers in which any appreciable number of trailers are drawn by the tractor.

The object of this invention is to render it possible to operate trains of trailers even at high speeds and over tortuous and uneven routes such as are usually encountered in road motor transport.

According to the invention, I provide automatic steering gear for trailers coupled together in a train drawn by a tractor or road locomotive. On the tractor, a gyro-compass is provided as well as a primary electric generator means operable by the gyro-compass, and also a plurality of primary electric motor means. In order to provide electrical circuits between the primary generator means and each of the primary motor means a primary distributor means is provided on the tractor, as well as driving means whereby the primary distributor is driven in synchronism with the travel of the train, so as to permit the primary generator means to transmit electrical energy to, and produce changes in the position of, the primary motors in succession, means being provided if necessary to hold these motors in their changed positions. A plurality of secondary generator means is provided on the tractor and each of these secondary generators is adapted to be driven by one of the primary motors. Secondary motor means is provided on each trailer, and a secondary distributor means mounted on the tractor is adapted to provide between the secondary generator means and the secondary motor of each trailer a number of circuits equal to the number of the secondary generators. The secondary distributor means is driven in synchronism with the travel of the train so as to permit the secondary generators when operated by the primary motors to transmit electrical energy to, and produce changes in the position of, the secondary motors of the respective trailers as and when these trailers successively arrive at the places on the route of the train at which the changes in the position of the gyro-compass productive of said changes in position of the primary motors occurred. In cases in which means is provided as aforesaid for holding the primary motors in their changed positions, means will also be provided for releasing the holding means after the last trailer has passed the place on the route at which the position of the primary motor means was fixed. On each trailer, there is also provided a secondary gyro-compass and a tertiary generator means operable by this secondary gyro-compass. In addition each trailer has a tertiary motor means operable by the tertiary generator means, and a steering gear which is operable by secondary motor means through the changes in the position thereof produced successively at the places along the route as aforesaid when reached by said trailer, and which is operable also by the tertiary motor means in each interval between successive operations of the secondary motor means so as to keep the steering gear at neutral and rectify any deviations of the trailer from its course.

The primary, secondary and tertiary generator and motor means may be of the type known by the trade name "Selsyn" as described on page 2, lines 10 to 40 of U. S. Patent No. 1,559,525 and on page 2, lines 49 to 109 of U. S. Patent No. 2,194,762. The primary distributor means may comprise a cylinder or wheel having conductive segments insulated from one another and each connected to a separate slip ring, which is connected to a primary motor as already referred to, the distributor being preferably so driven from one of the idler wheels of the tractor that one revolution of the distributor is, in each case, completed in the time taken by the train to travel a distance equal to its own length. The secondary distributor means, may in this case also comprise a cylinder or wheel of conductive segments insulated from each other and each connected to a separate slip ring, these slip rings being connected respectively to the secondary generator means, and the segments being rotated past a series of collector brushes which are spaced apart at an interval equivalent to the distance between corresponding points on any two consecutive trailers and which are connected respectively to the secondary motor means in the different trailers.

The steering gear provided on each trailer may comprise a pair of electro-magnets adapted to operate the steering mechanism of the trailer, and an electric switch which is adapted to cause energization of one or other of these magnets and comprises one arcuate contact rotatable by the secondary motor means so as to make or break the circuit of the one magnet and another arcuate contact rotatable by the tertiary motor means so as to make or break the circuit of the other magnet.

A steering equipment embodying the invention will now be described, by way of example, with reference to the accompanying drawing, which is a circuit diagram of the equipment.

The equipment illustrated is adapted for application to a train comprising a tractor and three trailers all of equal wheelbase, and is shown wired for 3-phase alternating current. All the equipment is provided on the tractor, except those parts which are specifically mentioned hereinafter as being provided on the individual trailers.

The gyro-compass 1, mounted on the tractor, is adapted, when deflected, to produce corresponding deflections in the rotor of a "Selsyn" generator 2 (herein called the "primary generator") which, in known manner, has on it a field winding which is energised by alternating current from an outside source (e. g. by an engine driven alternator or by a rotary converter driven from a battery on the tractor). The stator of the primary generator 2 has a 3-phase winding, the three leads 3, 4 and 5 of which are connected respectively to brushes 6, 7 and 8. These brushes bear upon rings of conductive segments 9 which are insulated from one another and connected to separate slip rings 10 as shown. These segmented rings or cylinders 9 and slip rings 10 constitute a primary distributor 50, which is rotated by means of shaft 55 from an idler wheel 51 of the tractor so that it completes one revolution while the train travels a distance equal to its own length. The segments 9 are spaced far enough apart to avoid their being short-circuited by the brushes 6, 7 and 8.

The slip rings 10 are connected through brushes by leads 11 to the stator windings of "Selsyn" motors 12 (hereinafter termed "primary motors"). As the bearing of the gyro-compass 1 changes, the different momentary positions thereof at successive intervals (as determined by the establishment of successive circuits through the segments 9 by the rotation of the primary distributor), produce different voltages as aforesaid in each of the phases of the stator winding of the primary generator 2 and these voltages are reproduced in each of the respective phases of the stator windings of the primary motors 12. This causes the rotors of the primary motors 12 to take up a position corresponding exactly to that of the primary generator 2 at the instant when the relative circuit through the corresponding segment 9 was established. No further movement of the rotor of this primary motor 12 takes place until the corresponding circuit is again unbalanced by the segments 9 in question again coming under the brushes 6, 7, 8.

Between the idler wheel 51 and the primary distributors 50, a separate rotor 56 is arranged. This separate rotor 56 is connected by means of the electric conductors 57 with the spring loaded electro-magnetic brakes 58 on the primary motors 12, and makes and breaks contact with these spring loaded electro-magnetic brakes 58, thus enabling them to be released and subsequently held in position until contact is again established. This arrangement serves as means for holding the primary motors in their changed positions as described above.

Each primary motor 12 is directly coupled by a common spindle 13 to a secondary generator 14 which is also of the "Selsyn" type. Each generator 14 has its stator winding connected by leads 15 to brushes 16 which bear upon slip rings 17, and these slip rings are connected to individual segments 18. The segments 18 are arranged in annular form—one ring for each phase—and are spaced apart sufficiently not to be short circuited by any of the brushes 19, 20, 21. Together, the segments 18 and rings 17 constitute a secondary distributor 52 which is rotated from the idler wheel 51 of the tractor in synchronism with the primary distributor 50. The brushes 19 to 21 are spaced apart at intervals equivalent to the distance between corresponding points on any two consecutive trailers, and, for each phase, are equal in number to the trailers included in the train (three in the example illustrated), being connected respectively by leads 23, 24, 25, to the stator winding of a secondary motor 27 on each trailer.

Showing of a fourth set of rings and segments, a fourth motor and generator serves to illustrate the provision of additional mechanism for an additional trailer.

The secondary motor 27 is of the "Selsyn" type and is coupled directly by a spindle 28 to a contact arm 29 which, through a counterbalanced silver contact roller or otherwise, makes sliding contact with an arcuate contact 30. This latter is connected to a collector ring 31 which is permanently connected to the electro-magnetic coil 53 of an electro-pneumatic valve 32. The circuit through this coil, arcuate contact 30 and arm 29 to the mains 33 is completed by leads 35 and 36 respectively.

Another arcuate contact 37 is arranged concentrically with the contact 30 and is connected to a second collector ring 38 which is permanently connected to the electromagnetic coil 54 of a second electro-pneumatic valve 39. The circuit through this coil, collector ring 38 and arcuate contact 37 to the mains 33 is completed by leads 40. The arcuate contacts 30, 37 and collector rings 31, 38 are rotatable as a unit by a spindle 42 controlled by the rotor of a "Selsyn" motor 43 (herein termed the tertiary motor). Leads 44 connect the stator winding of the tertiary motor 43 to the stator winding of the tertiary generator 45 (which is also of the "Selsyn" type) the rotor of which is controlled by a gyro-compass 46 which, in common with the rest of the apparatus just described, is mounted on the trailer.

The gyro-compass 1 on the tractor and the gyro-compass 46 on each trailer are electrically operated, current being supplied from the mains 33 through leads 47 and 48 respectively.

The operation of the apparatus illustrated is as follows:

The bearings of the gyro-compass 1 which are successively transmitted at regular intervals to the primary generator 2 are re-transmitted thereby through the leads 3, 4, 5, brushes 6, 7, 8, segments 9 and slip rings 10 of the primary distributor, and leads 11, to the successive primary motors 12. Thence, the bearings are transmitted by each motor 12 in succession to the corresponding secondary generator 14, then through the leads 15, brushes 16, slip rings 17, and segments 18 of the secondary distributor, which, as it rotates, transmits the bearings through the respective brushes 21, 20 and 19 in turn. The bearings are thence transmitted through the respective leads 23, 24, 25 to the secondary motor 27 of each trailer.

As the motor 27 turns the contact arm 29 in accordance with the successive bearings transmitted as described, it closes the circuit through one or other of the arcuate contacts 30, 37 and the magnets 53 and 54 of the electro-pneumatic valves 32, 39, which control the flow of air to one side or the other of a piston operating the steering gear of the trailer. As steering gear a servo-motor of the type used in aircraft for automatic pilots might be used; such servo-motors are described, for instance, in Molloy, E, "Aeroplane Instruments," parts 1 and 2, volumes 1 and 15 of the "Aeroplane Maintenance and Operation Series," published by George Newnes, Ltd., London. When the trailer has assumed the course dictated by any individual bearing, the trailer gyro-compass 46 (operating through the tertiary generator 45, leads 44, tertiary motor 43 and spindle 42) turns the arcuate contacts 30, 37 round until the neutral plane between these contacts coincides with the plane of the contact arm 29. In this position, the magnets 53 and 54 of both electro-pneumatic valves 32, 39 are de-energised, thus keeping the piston of the steering gear in its adjusted position.

The piston is brought back to its neutral position by reversal of the process: When the trailer attempts to continue moving to the right, its bearing changes slightly, and this slight movement shifts contact 37 under contact arm 29, thus energizing electro-pneumatic valve 39, which admits air to the opposite side of the piston and brings it back to neutral.

Whilst contact arm 29 maintains its position (which it will do on normal straight travel), the trailer will steer itself automatically, for any deviation from the prescribed course will bring contact 37 or 30 under contact arm 29 and cause operation of the steering gear as above described, until the neutral point regains its normal position under contact arm 29.

The same process is repeated for the other bearings of the gyro-compass 1. The rotation of the primary distributor segments 9, and the rotation of the secondary distributor segments, 18 are synchronised so that each bearing of the compass 1 is transmitted to the steering gear of each trailer, and produces a corresponding operation of this gear, at precisely the time when each trailer reaches the position along the route at which the corresponding bearing of the gyro-compass 1 on the tractor was taken.

If, while any trailer is proceeding on its way, it should deviate from the course corresponding to the transmitted bearing, the arcuate contacts 30, 37 will rotate under the action of the trailer gyro-compass 46, causing a circuit to be closed through the magnet of either the right-hand or left-hand electro-pneumatic valve 32 or 39, which will operate the piston of the steering gear to bring the trailer back to its course.

In practice, by means of this invention, trains up to as many as twenty-five or more trailers will be operable on highways with the aid of tractors or highway locomotives of the Diesel-electric or other type, developing ample tractive power, applied through an adequate number of driving wheels.

The advantage of such highway trains will be readily appreciated when one considers they will enjoy the flexibility of motor transport whilst sharing the operational economies and high carrying capacity of railways, without requiring heavy capital expenditure in permanent way. To this may be added the freedom from long delays often encountered when bringing new railway lines into operation. This new mode of transport, however, should find useful application not only in countries being newly developed, where adequate rail facilities are still lacking, but also in more advanced countries, as feeders to existing railway lines. Although essentially of non-military character, these highway trains will nevertheless also find their place in military operations on far-flung battlefronts, where the success of a campaign very often depends upon the high command's ability to maintain a ceaseless flow of needed supplies.

I claim:

1. Automatic steering gear for trailers coupled together in a train drawn by a tractor, comprising, in combination, a gyro-compass or directional gyroscope provided on the tractor, primary electric generator means operable by said gyro-compass or directional gyroscope, a plurality of primary electric motor means, primary distributor means adapted to provide electrical circuits between said primary generator means and each of said primary motor means, driving means whereby said primary distributor means is driven in synchronism with the travel of said train so as to permit said primary generator means to transmit electrical energy to, and produce changes in the position of, said primary motor means in succession, a plurality of secondary generator means each adapted to be driven by one of the said primary motor means, a secondary motor means provided on each trailer, secondary distributor means adapted to provide between said secondary generator means and the secondary motor means of each trailer a number of circuits equal to the number of said secondary generator means, said secondary distributor means being driven by said driving means in synchronism with the travel of said train so as to permit said secondary generator means when operated by said primary motor means to transmit electrical energy to, and produce changes in the position of, the secondary motor means of each trailer as said trailers successively arrive at the places on the route of the train at which the changes in the position of the gyro-compass or directional gyroscope productive of said changes in position of the primary motor means occurred, a secondary gyro-compass or directional gyroscope provided on each trailer, tertiary generator means operable by said secondary gyro-compass or directional gyroscope, tertiary motor means operable by said tertiary generator means, a steering gear for each trailer operable by said secondary motor means through said changes in position thereof produced successively at the places on the route as aforesaid when reached by said trailer and operable also by said tertiary motor means in each interval between successive operations by said secondary motor means so as to keep said steering gear at neutral and prevent deviation of the trailer from its course.

2. Automatic steering gear for trailers, according to claim 1, in which the primary, secondary and tertiary generator and motor means are of the self-synchronous type.

3. Automatic steering gear for trailers, according to claim 1, in which means is provided whereby the primary motor and secondary generator and motor means have their moving parts positively held in their adjusted positions and in which means is provided for releasing these parts after the last trailer in the train has passed the place on the route at which the bearing of the gyro-compass or directional gyroscope on the tractor productive of the changes of position of the said generator and motor means existed.

4. Automatic steering gear for trailers, according to claim 1, in which the primary distributor means comprises a cylinder or wheel having conductive segments, means for insulating the segments from one another, a separate slip ring for each segment, means for connecting each segment to its slip-ring, and means for connecting each slip-ring to a primary motor.

5. Automatic steering gear, according to claim 1, in which said driving means for said primary and secondary distributor means consist of one of the idler wheels of the tractor so that one revolution of the said distributor means is completed in the time taken by the train to travel a distance equal to its own length when operating with its complement of trailers.

JOÃO MACHADO BELO.

REFERENCES CITED

The following references are of record in the file of this patent:

UNITED STATES PATENTS

| Number | Name | Date |
|---|---|---|
| 1,804,257 | Greenley | May 5, 1931 |
| 2,194,762 | Maliphant | Mar. 26, 1940 |
| 1,559,525 | Murphy et al. | Oct. 27, 1925 |
| 2,339,291 | Paulus et al. | Jan. 18, 1944 |